Patented July 23, 1940

2,209,299

UNITED STATES PATENT OFFICE

2,209,299

GLUTATHIONE COMPOUNDS AND A METHOD OF MAKING THE SAME

Walter Schoeller, Berlin-Charlottenburg, and Hans Goebel, Berlin-Reinickendorf, Germany, assignors to Schering Corporation, Bloomfield, N. J., a corporation of New Jersey No Drawing. Application March 4, 1937, Serial No. 128,928. In Germany March 6, 1936

5 Claims. (Cl. 260—534)

This invention relates to glutathione and its salts and more especially to SH-glutathione and its alkaline earth metal salts, and a method of making the same.

For the purpose of the manufacture of free SH-glutathione hitherto one has proceeded in such a manner that, for example, the copper salt of the glutathione obtained according to known methods is split up by treatment with hydrogen sulphide. By this means there is obtained a solution of the free glutathione in water, which is concentrated in vacuum. From the concentrate crystallises, if desired, on the addition of alcohol, a portion of the glutathione present, while the non-crystallising main quantity has for the most part passed into the S—S form. According to this process it was hitherto only possible to obtain a total yield of 40-50% of crystallised SH-glutathione. In addition it must be taken into account that with large batches the crystallisation takes several days and the yields become still worse by oxidation.

In accordance with the present invention these difficulties in the production of free SH-glutathione are easily overcome and the direct yields increased to 80-90%. The process of the invention comprises the step of first converting a solution of the free glutathione obtained in any suitable manner, for example, from its heavy metal salts, such as the copper salt, into a soluble alkaline earth salt and, if desired, concentrating the solution in vacuum. From the concentrated solution the alkaline earth salt can then be practically quantitatively precipitated, for example, by pouring into suitable organic solvents such as alcohol, acetone or the like. By the expression "alkaline earth metal" as used in the specification and in the claims annexed hereto there are to be understood not only calcium, strontium and barium but also magnesium.

The dry alkaline earth salt is thereupon converted into the free acid by quantitatively treating it, for example, with the calculated quantity of oxalic acid or sulphuric acid or another substance forming with alkaline earth metals insoluble or difficultly soluble compounds. By selection of suitable reaction conditions solutions of the free SH-glutathione are obtained which, if at all need to be only slightly concentrated in order to cause the glutathione to crystallise out in a degree of purity of 98-99%.

The principle of the present invention is thus to be seen in not directly working up dilute glutathione solutions obtained in any suitable manner but first converting into the alkaline earth metal salts, isolating these and thereupon liberating the glutathione from them.

Furthermore this process allows the production of the hitherto unknown alkaline earth metal salts of SH-glutathione. Said salts possess valuable therapeutical properties and thus are used as medicine.

The following example illustrates the invention without, however, limiting the same to them:

Example

To a solution of 45 grams of free glutathione in 250 ccs. of water is added an excess of solid calcium carbonate, the whole is allowed to stand for some hours with periodic stirring and then filtered from insoluble material. The solution is thereupon allowed to flow with stirring in a thin stream into 1 litre of ice cold denatured alcohol, whereby the calcium salt of the glutathione immediately precipitates. After short settling the alcohol is poured off, the salt filtered with suction and washed dry with alcohol and ether. There are obtained about 47 grams of calcium salt =98.75% of the theory.

The 47 grams are finely ground and split up with the calculated quantity of aqueous 2N-oxalic acid solution for the quantity of calcium present.

After filtering off the calcium oxalate there crystallises from the filtrate suitably, after the addition of 20-25 ccs. of alcohol on standing in a vacuum desiccator, in about two days 38-39 grams of pure glutathione.

After further careful concentration of the mother liquor in vacuum the yield can be increased by a further 3-4 grams.

The residual mother liquor is best again converted into the calcium salt in order to obtain also the quantities of glutathione not yet recovered.

Instead of the calcium salt the glutathione can also be precipitated as barium, strontium or magnesium salt.

Instead of the carbonates of the alkaline earth metals and magnesium one may also use the oxides or hydroxides of the same. Instead of by alcohol the precipitation of the alkaline earth metal salt may be effected by other solvents wherein said salts are insoluble. A further purification of the alkaline earth and magnesium metal salts may be effected, if required, by dissolving the same in water and reprecipitating by alcohol or any other suitable solvent.

Of course, many other changes and variations may be made by those skilled in the art in accordance with the principles set forth herein and in the claims annexed hereto.

What we claim is:

1. A method of obtaining free glutathione which comprises providing a solution of free glutathione, mixing the same with an alkaline earth metal compound taken from the class consisting of the carbonates, oxides and hydroxides of the alkaline earth metals whereby a reaction takes place with the formation of the alkaline earth metal salt of the glutathione, adding thereto a water-miscible organic solvent to render said glutathione salt insoluble, and decomposing said glutathione salt to produce the free crystallizable acid.

2. A method of obtaining free glutathione which comprises providing a solution of free glutathione, mixing the same with an alkaline earth metal compound taken from the class consisting of the carbonates, oxides and hydroxides of the alkaline earth metals whereby a reaction takes place with the formation of the alkaline earth metal salt of the glutathione, adding thereto a water-miscible organic solvent taken from the class consisting of alcohol and acetone to render said glutathione salt insoluble, and decomposing said glutathione salt to produce the free crystallizable acid.

3. A method of obtaining free glutathione which comprises providing a solution of free glutathione, mixing the same with an alkaline earth metal compound taken from the class consisting of the carbonates, oxides and hydroxides of the alkaline earth metals whereby a reaction takes place with the formation of the alkaline earth metal salt of the glutathione, and decomposing said glutathione salt to produce the free crystallizable acid.

4. A method of obtaining alkaline earth metal salts of free glutathione which comprises providing a solution of free glutathione, mixing the same with an alkaline earth metal compound taken from the class consisting of the carbonates, oxides and hydroxides of the alkaline earth metals whereby a reaction takes place with the formation of the alkaline earth metal salt of the glutathione, and adding thereto a water-miscible organic solvent to render said glutathione salt insoluble.

5. A method of obtaining alkaline earth metal salts of free glutathione which comprises providing a solution of free glutathione, mixing the same with an alkaline earth metal compound taken from the class consisting of the carbonates, oxides and hydroxides of the alkaline earth metals whereby a reaction takes place with the formation of the alkaline earth metal salt of the glutathione.

WALTER SCHOELLER.
HANS GOEBEL.